Figure 5:
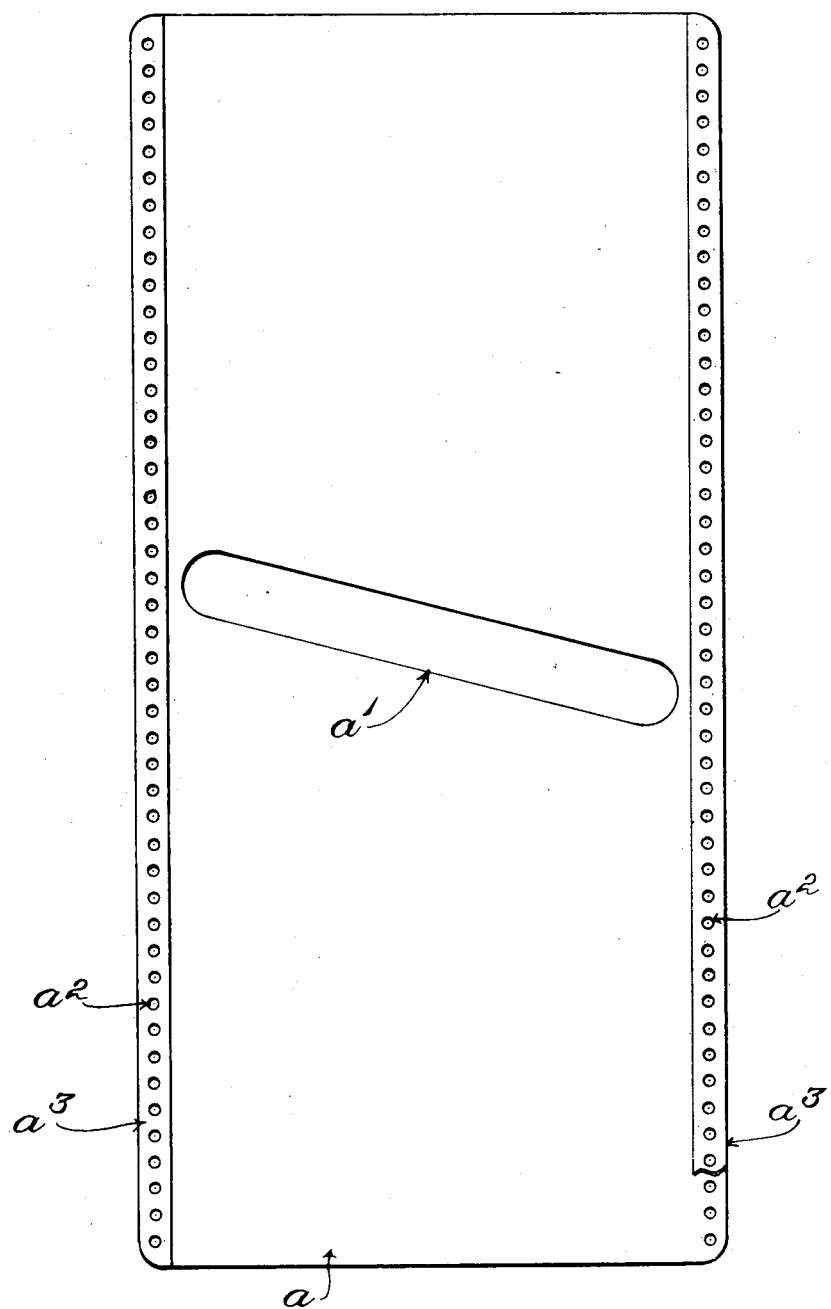

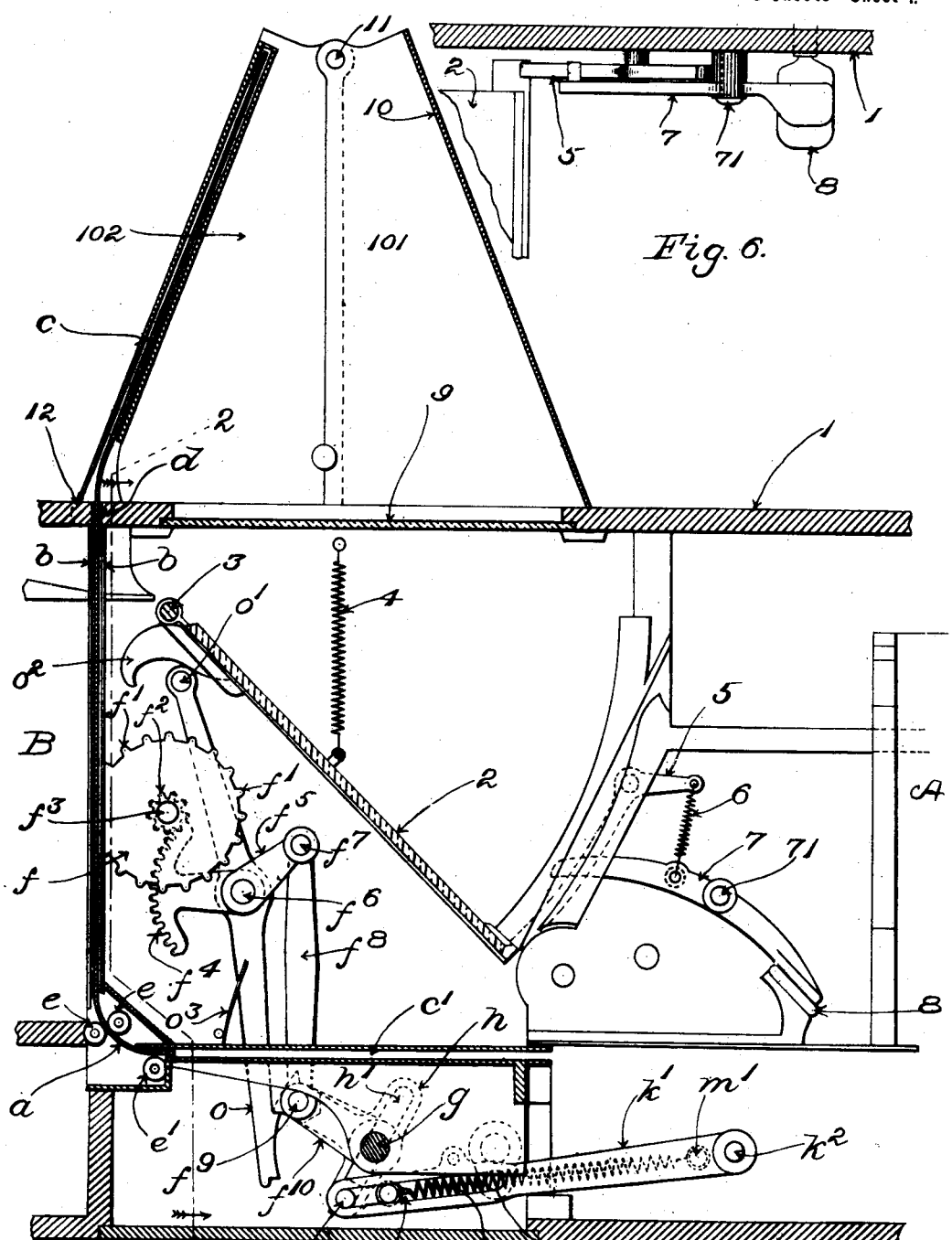

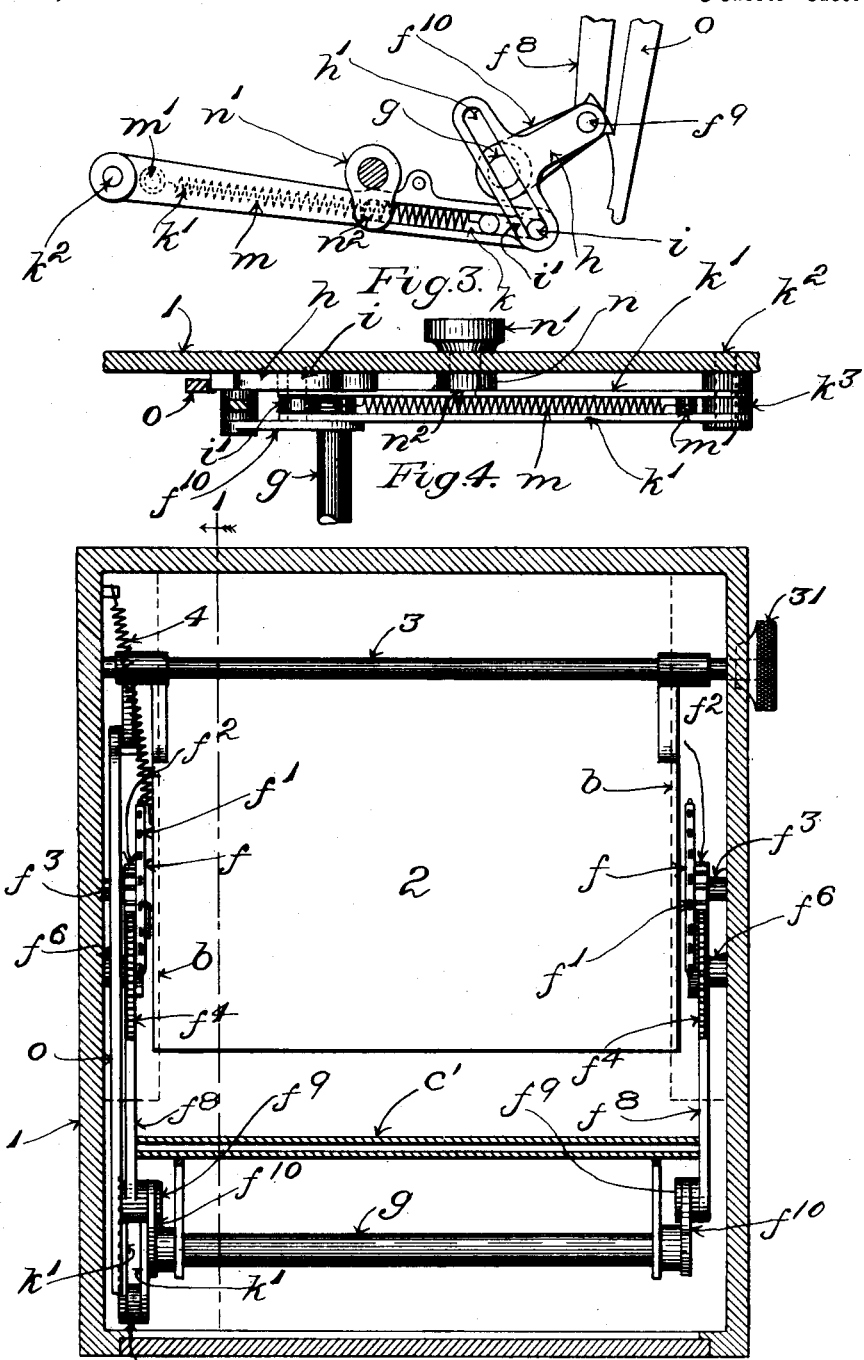

No. 711,064. Patented Oct. 14, 1902.
F. W. MERRICK.
PHOTOGRAPHIC CAMERA.
(Application filed Aug. 9, 1901.)
(No Model.) 3 Sheets—Sheet 3.

Witnesses: Inventor:
Arthur D. Randall Frank W. Merrick
Oscar F. Hill By Macleod Calver & Randall
Attorneys.

UNITED STATES PATENT OFFICE.

FRANK W. MERRICK, OF BOSTON, MASSACHUSETTS.

PHOTOGRAPHIC CAMERA.

SPECIFICATION forming part of Letters Patent No. 711,064, dated October 14, 1902.

Application filed August 9, 1901. Serial No. 71,484. (No model.)

*To all whom it may concern:*

Be it known that I, FRANK W. MERRICK, a citizen of the United States, residing at Boston, in the county of Suffolk, State of Massachusetts, have invented a certain new and useful Improvement in Photographic Cameras, of which the following is a specification, reference being had therein to the accompanying drawings.

In accordance with my invention I form the shutter of a photographic camera of a length of flexible material having therethrough a transverse slit or opening for the passage of light to the sensitized surface in making the exposure of the latter. Guides are provided, in which the shutter is arranged to be propelled lengthwise, and with the shutter are combined propelling or feed wheels engaging with intermediate portions of the length of the flexible shutter and serving to move the same back and forth lengthwise within its guides. Preferably, in order to obviate any tendency of the propelling-wheels to slip or lose their hold upon the shutter, which would result in a failure to move the shutter at the required instant, and in dwells or variations of speed during the movement of the shutter, the propelling-wheels are furnished with teeth or pins to enter holes formed in series extending lengthwise of the shutter. With the propelling-wheels are combined a spring-actuator and also a trigger arrangement.

As will be understood, in the normal position of the shutter the exposure-slit thereof is located entirely to one side of the sensitized surface which is to be exposed, and when the trigger is operated to free the wheels the latter are rotated quickly by the spring-actuator and move the shutter so as to traverse the exposure-slit across the sensitized surface.

It is contemplated that the shutter in practice usually shall have combined therewith double-acting or reversely-acting spring-actuator mechanism, so as to enable successive exposures to be made by the successive movements of the flexible shutter in opposite directions. This will obviate the necessity for making return of the shutter to its starting position by hand after one exposure in preparing for the next.

The invention comprises the improvements in the shutter and also in the means of mounting and actuating the same, which I will now describe with reference to the accompanying drawings, the latter showing the best embodiment of the invention which I have thus far devised.

In the drawings, Figure 1 shows in longitudinal section portions of a camera having applied thereto the said embodiment of the invention. Fig. 2 is a view looking from the left-hand side, chiefly in section, on line 2 2 in Fig. 1, showing mainly the shutter-actuating mechanism, the casing or framing of the camera being in vertical section. Fig. 3 shows, mainly in side elevation, the double-acting spring-actuator and a part of the trigger arrangement. Fig. 4 shows the same in plan with a part of the camera casing or framing in section. Fig. 5 shows the improved shutter. Fig. 6 shows in plan the catch and releasing devices of the mirror.

Having reference to the drawings, 1 designates the casing or framing of the camera, the lens and lens-opening of which are located at or adjacent the letter A in Fig. 1. The plate or other sensitized surface to be exposed will be located in practice adjacent the letter B in said figure. The camera in general may be of any suitable approved character. The drawings are intended to show only enough of a camera to render clear the nature and relations of the invention.

2 designates a focusing-mirror, such as is employed in certain forms of cameras. It is movable to enable it to be placed in position for focusing, as in Fig. 1, of the drawings, and then to be shifted out of the way for the exposure. The manner of arranging and operating the said mirror may vary in practice. Herein it is represented as hung or pivoted by one edge thereof upon a horizontal rod 3, extending transversely across the camera, so as to enable it to be swung down into the oblique or inclined position shown in Fig. 1 in line with the lens-opening. It has connected therewith a spring, as 4, acting with a tendency to raise the said mirror from the position which it occupies in Fig. 1 into an elevated and substantially horizontal position removed from the path of the light-rays between the lens and the surface being exposed. For the purpose of enabling the mirror to be swung by hand down from the normal upraised position thereof into the position which is represented in Fig. 1 the rod 3 is shown furnished with a handle 31, and for the purpose of holding the mirror in the latter position a pivoted catch 5 is provided, the acting extremity of which in the present instance is arranged to engage with a projection from the lower edge of the mirror, the said catch having connected therewith the spring 6, acting with a tendency to move the same into engaging position. For the purpose of effecting the release of the focusing-mirror, so that it may be elevated by the action of its spring 4 at the required instant preparatory to the exposure of the sensitized surface, the catch 5 has combined therewith a releasing-lever 7, which is pivoted at 71, one arm of which has a lateral projection 72, arranged to engage with the catch. The spring 6 extends from the said arm or extremity to the tail of the catch 5 and normally is distended, so that its tension operates with a tendency to swing the catch into its engaging position and also to restore the disengaging lever 7 to its normal position after having been actuated to disengage the catch by means of a suitable device for the purpose, herein constituted by the bulb 8. Bulb 8 will in practice have connected therewith suitable means of inflating or expanding the same when it is required to work the disengaging lever and occasion the retraction of the focusing-mirror. Usually the said means will be constituted by the flexible tube and hand-bulb in common use.

I have been thus particular in describing the focusing-mirror and its operating connections because it is intended that in certain forms of cameras embodying focusing-mirrors and having my invention applied thereto the same act on the part of the person using a camera by which the retraction of the mirror thereof is brought about shall also bring about the movement of the shutter for occasioning the required exposure, and because, further, in order conveniently to insure the required timing in the action of the parts I shall in some instances, as in the illustrated embodiment of the invention, utilize the movement of the mirror itself for bringing about the movement of the shutter. It will be understood, however, that my invention is not necessarily restricted to constructions in which the focusing-mirror or its actuating or releasing means is utilized to bring about the movement of the shutter, nor, indeed, to use in focusing cameras having mirrors on the order of that herein illustrated, for I contemplate the use of the invention in other kinds of cameras as well.

A ground-glass plate 9 is shown above the mirror 2 in position to receive the image which is reflected from the latter, and at 10 is shown a hood surrounding plate 9 and extending upwardly above the same. The said hood when upraised into position, as in Fig. 1, is shaped like a truncated wedge, its smaller upper end having an opening, as shown, through which the plate 9 may be viewed. Preferably the hood 10 is formed in two halves, meeting on vertical lines and hinged together at the top, as at 11, Fig. 1, one of the halves being pivoted at the outer corners of its base, as at 12, Fig. 1, to the upper portion of casing 1 of the camera. This construction enables the hood when not required to be used to have the halves thereof extended in line with each other and flattened down upon the top of the camera-casing, the side flanges 101, 102 of the two halves of the hood passing down alongside the sides of the camera-casing.

My shutter is represented at $a$. It is composed of material having sufficient stiffness to enable the same to be propelled lengthwise within its guides by the action of the propelling-wheels, and yet at the same time having sufficient flexibility to enable it to follow the more or less deflected course which it is required to take in the camera. In practice thus far I have employed tough paper with successful results. The shutter $a$ is shown separately in Fig. 5. The exposure slit or opening therein is shown at $a'$.

At each side of the place B for the sensitized surface to be exposed a pair of guides $b$ $b$ is provided. The opposite side edges of the shutter fit within these pairs of side guides. The opposite ends of the shutter work within guideways $c$ $c'$, as shown clearly in Fig. 1. Guideway $c$ is provided in the half 102 of the hood 10 and guideway $c'$ is provided in the lower portion of the camera-casing. In the upraised position of the hood the guideway $c$ occupies a somewhat-inclined position; but the inclination is not sufficient to interfere with the free movement of the upper portion of the shutter within the said guideway. This portion of the shutter works through a slit $d$ in the top of the camera-casing. Guideway $c'$ is horizontal in the illustrated embodiment of the invention. As a means of confining the shutter and facilitating the change of direction of the same in passing between the side guides $b$ $b$ and the guideway $c'$ guide-rolls $e$ $e'$ may be employed.

The shutter-propelling wheels, by means of which the shutter $a$ is moved for the purpose of traversing the exposure-slit $a'$ thereof across the sensitized surface at B, are arranged to engage with an intermediate portion of the length of the shutter. In the illustrated embodiment of the invention they are located at the opposite sides of the place B for the sensitized surface and immediately adjacent the guides $b$ $b$. While various arrangements of the said wheels are practicable within the limits of the invention, I have in practice employed a single wheel, as shown, at each side, and for the purpose of insuring that the shutter shall move in unison with the said wheels I have provided the latter with projections, as pins or teeth $f'$ $f'$, entering holes $a^2$ $a^2$, formed in the edge portions of the shutter in series extending lengthwise of the shutter, so that the propelling-wheels will move the shutter bodily lengthwise the guideways in which it is mounted. (See Fig. 5.) If desired, the perforated edge portions of the shutter $a$ may be reinforced by additional thicknesses of material, as at $a^3$ $a^3$.

For the convenient actuation of the propelling-wheels $f$ $f$ each thereof has connected therewith a pinion $f^2$, each wheel and its pinion being mounted upon a stud $f^3$, secured to casing 1. Each pinion $f^2$ is engaged by a gear-segment $f^4$, carried by a lever $f^5$, pivoted to the casing at $f^6$ and having connected therewith at $f^7$ the upper end of a connecting-rod $f^8$. The lower ends of the connecting-rods $f^8$ $f^8$ are pivoted to studs $f^9$ $f^9$ on arms $f^{10}$ $f^{10}$ of a rock-shaft $g$. Movement communicated to the said rock-shaft is transmitted to the levers $f^5$ $f^5$ and their gear-segments $f^4$ $f^4$ through the connections described, and through the engagement of the gear-segments with the pinions $f^2$ $f^2$ the wheels $f'$ $f'$ are operated to propel the shutter lengthwise first in one direction and then in the other. One of the studs $f^9$ has attached thereto (see more especially Fig. 3) a plate $h$. Said plate is separated from the arm $f^{10}$ by a distance slightly greater than the width of the corresponding connecting-rod $f^8$, the eye at the lower end of said connecting-rod fitting the stud $f^9$ between the arm and plate, as shown in Fig. 2. The plate $h$ is formed with a slot $h'$, extending diametrically, with relation to rock-shaft $g$, at right angles to arms $f^{10}$ $f^{10}$. In this slot is engaged the projecting end of a pin $i$. The said pin works in the longitudinal slots $k$ $k$ in the outer extremities of a pair of arms $k'$ $k'$, the said arms being mounted upon a pivotal pin $k^2$. A spacing-collar $k^3$ is placed upon the pin $k^2$ between the arms $k'$ $k'$, while between the said outer extremities thereof a collar $i'$ is mounted upon pin $i$, the said collar having an extension with which is connected one end of a contracting spiral spring $m$, located between the arms $k'$ $k'$, the opposite end of said spring being connected with a cross-pin $m'$, connecting the arms $k'$ $k'$. A crank $n$ is journaled in the adjacent side of the casing $l$ and furnished outside with a disk or head $n'$, by means of which the same may be turned. The pin $n^2$ of the said crank works in the slot $k$ of one of the arms $k'$. By giving a half-rotation to the said crank the pin $i$, which is a connecting-link between spring $m$ and plate $h$, may be shifted from one end of slot $h'$ in the said plate to the other end thereof past the axis of the rock-shaft $g$. Supposing the pin $i$ to be located at one end of slot $h'$ and the spring $m$ free to act, the said spring will communicate a partial rotation to the rock-shaft $g$ and through the connections of the latter will rotate the propelling-wheels $f$ $f$ in one direction, thereby propelling the shutter $a$ lengthwise into one extreme position thereof. The engagement of the trigger $o$ with the free extremity of the plate $h$ will hold the parts in the position which they have been thus caused to assume. In order to provide for the reverse movement of the shutter $a$, a half-revolution will be communicated by hand to the crank $n$, thereby swinging arms $k'$ $k'$, so as to cause pin $i$ to travel to the opposite end of slot $h'$ in plate $h$ past the center or axis of rock-shaft $g$. The parts will now be in readiness to act again, but will be held in set position in consequence of the engagement of trigger $o$ with the plate $h$. Upon disengaging the trigger $o$ from the plate $h$ the rock-shaft $g$ will be turned by the action of spring $m$ part way in the other direction, causing, through the operating connections already described, the reverse movement of the shutter. The trigger $o$ is mounted pivotally upon the stud $f^6$ and is under control of spring $o^3$. It is double acting to enable it to engage with plate $h$ in each of the opposite positions of the rock-shaft $g$. Accordingly it will automatically engage with said plate $h$ after each movement thereof occasioned by the spring $m$ and will hold the rock-shaft $g$ from movement while the pin $i$ is being shifted by hand from one end of slot $h'$ to the other thereof and until it (the said trigger) is intentionally disengaged from said arm.

In order to operate the trigger $o$ automatically in proper timing with relation to the focusing-mirror 2, I provide the upwardly-extending arm thereof with a pin $o'$, arranged in position to be engaged by a finger $o^2$, with which the mirror 2 is provided. In the upward movement of the mirror the said finger engages with the pin $o'$ and moves the trigger to disengage the latter from arm $h$.

A shutter formed of thin flexible material and having a transverse exposure slit or opening $a'$ has a tendency to bow or bulge outward above and below the said slit or opening, so that the edges of the latter project from the general plane of the shutter and are liable to catch against objects past which such edges are caused to travel in the movements of the shutter—for example, the transverse edges of the slot $d$ or of the guideways $c$ $c'$. This may either tear the shutter or interfere with the proper working thereof. I have discovered that by forming the exposure slit or opening so that its edges shall be transversely inclined relative to the direction of movement of the shutter the said edges will draw readily past any fixed edges or other parts past which they may be carried in the action of the shutter without catching and holding. Thereby tendency to injury to the shutter and interference with its proper working are avoided.

What I claim is—

1. In a photographic camera, in combination, the flexible shutter, guides for said shutter, wheels engaging with said shutter to propel the same lengthwise, and means to actuate the said propelling-wheels.

2. In a photographic camera, in combination, the flexible shutter, guides within which said shutter is movable lengthwise, propelling-wheels engaging with intermediate portions of the length of said shutter, and means to actuate the said propelling-wheels.

3. In a photographic camera, in combination, the shutter having perforations in series extending lengthwise thereof, guides therefor, propelling-wheels having projections engaging in said perforations to feed the shutter, and means to actuate the said propelling-wheels.

4. In a photographic camera, in combination, the flexible shutter, guides for said shutter, wheels engaging with said shutter to propel the same lengthwise, spring-actuator devices for said wheels, and trigger mechanism to control the movement of the shutter.

5. In a photographic camera, in combination, the flexible shutter, guides for said shutter, wheels engaging with said shutter to propel the same, reversely-operating or double-acting spring-actuator devices for said wheels, and the trigger mechanism to control the movement of the shutter.

6. In a photographic camera, in combination, the focusing-mirror, the flexible shutter, guides for said shutter, wheels engaging with said shutter to propel the same, a spring-actuator for said wheels, and a trigger operatively controlled by said mirror.

7. In a photographic camera, in combination, the focusing-mirror, the flexible shutter, guides for said shutter, wheels engaging with the shutter to propel the same, a double-acting or reversely-operating spring-actuator for said wheels, and a double-acting trigger operatively controlled by said mirror.

8. In a photographic camera, in combination, the flexible shutter, propelling-wheels engaging with the opposite edge portions thereof, spring-actuator mechanism for said wheels, and a trigger to control the action of said mechanism.

9. In a photographic camera, in combination, the flexible shutter having series of perforations adjacent the edges thereof, propelling-wheels having projections working in the said perforations, spring-actuator mechanism for said wheels, and a trigger to control the action of said mechanism.

10. In a photographic camera, in combination, the flexible shutter, propelling-wheels engaging with said shutter adjacent the opposite edges thereof, a rocker in operative connection with said wheels, a trigger to control the movements of said rocker and wheels, a spring-actuator for said rocker, and means to shift the point of connection of said spring-actuator to opposite sides of the axis of movement of said rocker.

11. In a photographic camera, in combination, a focusing-mirror, a detent therefor, means to release said detent, the flexible shutter, propelling-wheels engaging with said shutter adjacent the opposite edges thereof, a rocker in operative connection with said wheels, a trigger under operative control of said mirror and acting to control the movements of said rocker and wheels, a spring-actuator for said rocker, and means to shift the point of connection of said spring-actuator to opposite sides of the axis of movement of said rocker.

12. In a photographic camera, and in combination, a flexible shutter having a transverse exposure-opening inclined with respect to the direction of movement of the shutter, guides for said shutter, and means to move the said shutter lengthwise.

13. In a photographic camera and in combination, a flexible shutter having a transverse exposure-opening provided with straight edges which are inclined with respect to the direction of movement of the shutter, guides for said shutter and means to move the shutter lengthwise.

14. In a photographic camera and in combination, a flexible shutter having a transverse exposure-opening provided with straight parallel edges which are inclined with respect to the direction of movement of the shutter, guides for said shutter and means to move the shutter lengthwise.

15. In a photographic camera and in combination, a flexible shutter, guides within which said shutter is bodily movable, and operating means for said shutter to move the same lengthwise within said guides.

16. In a photographic camera and in combination, a flexible shutter, guides within which said shutter is bodily movable, and reversely-acting operating means for said shutter to move the same lengthwise within said guides, in opposite directions alternately.

17. In a photographic camera, in combination, the casing, the flexible shutter, guides within said casing for said shutter, the movable and erectile hood applied to said casing and also containing a guide receiving a portion of said shutter, and means to propel the shutter lengthwise within said guides.

In testimony whereof I affix my signature in presence of two witnesses.

FRANK W. MERRICK.

Witnesses:
CHAS. F. RANDALL,
WILLIAM A. COPELAND.